W. A. TURBAYNE.
SYSTEM OF ELECTRICAL DISTRIBUTION.
APPLICATION FILED AUG. 13, 1919.
1,400,502.
Patented Dec. 13, 1921.
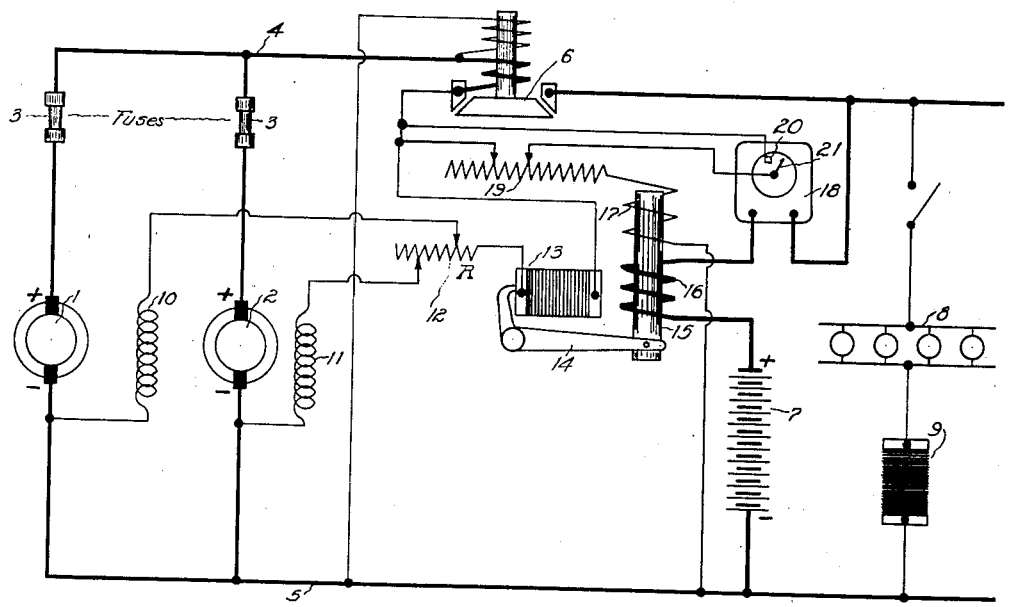
WITNESS:
INVENTOR.
William A. Turbayne.
BY
ATTORNEY.

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

SYSTEM OF ELECTRICAL DISTRIBUTION.

1,400,502.  Specification of Letters Patent.  Patented Dec. 13, 1921.

Application filed August 13, 1919. Serial No. 317,276.

*To all whom it may concern:*

Be it known that I, WILLIAM A. TURBAYNE, a citizen of the United States, residing at Niagara Falls, in the county of Niagara and State of New York, have invented new and useful Improvements in Systems of Electrical Distribution, of which the following is a specification.

The present invention relates to systems of electrical distribution.

More particularly the present invention relates to systems, as for instance, car-lighting systems wherein a variable speed generator or generators, driven according to the speed of the train, supply current for translating devices. At the time that the train is at rest, current for the translating devices is taken from a storage battery which storage battery is charged by the generator or generators when the train is moving at a sufficiently high speed.

The generator or generators are ordinarily driven from the car axle by means of a belt. In systems having a relatively great capacity, trouble is sometimes encountered due to the fact that under certain conditions it is almost impossible to obtain sufficient tractive effort upon the belt. Instead of using one large generator, it is sometimes more satisfactory to use two machines of smaller capacity.

An object of the present invention is to provide an improved car lighting system in which two generators are provided to supply electric current.

A further object is to provide a system involving two generators connected in parallel, which system will be simple and efficient in its operation.

Further objects will appear as the description proceeds.

Referring to the one figure of the drawing,—

The numerals 1 and 2 indicate two dynamo-electric machines. These machines 1 and 2 are connected through fuses 3, 3 to supply current to the mains 4 and 5. Connected in the main 4 is an automatic switch 6 which may be of the usual well understood construction. Connected across the mains 4 and 5 is a storage battery circuit containing the storage battery 7. Also connected across said mains is a translating circuit containing translating devices 8 and translation circuit regulator 9. The translation circuit regulator 9 will be automatic in its action, tending to maintain a substantially constant voltage across the translation devices 8.

The generator 1 is provided with a shunt field winding 10, while the generator 2 is provided with a shunt field winding 11. Like terminals of the field windings 10 and 11 are connected to brushes of the generators 1 and 2 having like polarity. The other terminals of said field windings 10 and 11 are connected together. According to the present invention, the two generators have similar speed voltage characteristics. In order to provide for any slight discrepancy that might exist in practice in the speed voltage characteristics of the two machines, the field windings 10 and 11 may be connected through the adjustable resistance 12. Adjustable resistance 12 is connected through variable resistance medium 13 to the main 4 whereby said variable resistance medium 13 connects the two field windings 10 and 11 across the mains 4 and 5.

The variable resistance medium 13 may be automatically controlled to respond to functions of the system. Said variable resistance medium is operated by means of a bell crank lever 14 which in turn is operated by a plunger 15. The plunger 15 has been illustrated as being controlled by a pair of electro-magnetic windings 16 and 17. Said windings 16 and 17 may be designed to have any desired proportions and may coöperate in a number of different ways in accordance with the wish of the designer. The electro-magnetic winding 16 is shown as being connected in the battery circuit whereby to respond to the current flow in said circuit. Also connected in the storage battery circuit is an ampere hour meter 18. This ampere hour meter 18 will measure the current flowing into and out of the battery 7. Said meter 18 should be of such design that it operates at a higher speed rate upon battery discharge than upon battery charge, whereby to compensate for the fact that the battery has an efficiency of less than 100 per cent. Such meters are well known in the art and need no description here. Said meter has the function of controlling the effect of the electro-magnetic winding 17, whereby to change the effect of said winding when a predetermined battery input has been measured.

Electro-magnetic winding 17 is connected across mains 4 and 5 through adjustable resistance 19. The ampere hour meter is provided with a stationary contact 20 and a movable contact 21. When movable contact 21 of the meter is in engagement with stationary contact 20, the resistance in the circuit of the electro-magnetic winding 17 will be materially reduced. The system will be so designed that when the ampere hour meter 18 registers full charge for the battery, the effect of electro-magnetic winding 17 will be increased, whereby to cut down the voltage developed by the generators 1 and 2.

A mode of operation of the above described embodiment of the present invention will be at once understood. With the generators operative they will deliver a current to supply the storage battery 7 and translation devices 8. Inasmuch as the generators have similar speed voltage characteristics, they will share the load in inverse proportion to their armature resistances. If the belt of one of the machines should tend to slip, the circulating current supplied by the other machine would, through motor action, act to maintain the speed of both machines at practically similar value and the slipping tendency would thereby be satisfactorily overcome. This circulating current being confined to the two armatures only, would have no disturbing effect on the balance of the system. The fact that the two generators have their field windings controlled by the same regulator, produces the decided advantage that the many difficulties which are commonly encountered in operating generators in parallel are overcome. The two generators will charge the storage battery if said battery needs charging, the electro-magnetic windings 16 and 17 combining to regulate the generators to produce the characteristics desired. When full charge for the storage battery has been measured by the ampere hour meter 18, the movable contact 21 of said meter will engage the stationary contact 20, eliminating part of the resistance from the adjustable rheostat 19, thereby increasing the effect of winding 17. The parts may be adjusted whereby at this time the voltage of the generators may be reduced to substantially the floating voltage of the storage battery 7, leaving the generators still operative to supply any demands of the translating devices 8.

One embodiment of the present invention has been described in detail. Many modifications will occur to those skilled in the art. It is intended in this patent to cover all such modifications that come within the scope of the present invention as defined by the appended claims.

What I claim as new and desire to secure by Letters Patent of the United States, is—

1. In combination, a pair of variable speed generators, a pair of mains across which said generators are connected in parallel, each of said generators having a field winding, said field windings being connected to one of said mains, an adjustable resistance, the other terminals of said windings being connected together through said resistance, a variable resistance medium, means for controlling said medium, said windings being connected through said medium to the other of said mains.

2. In a system, in combination, a pair of variable speed generators connected in parallel, said generators having approximately the same speed voltage characteristics, an adjustable resistance, said generators having like terminals of their field windings connected through said adjustable resistance, a field controlling medium responsive to the functions of said system, said field windings with said adjustable resistance being connected across said system through said medium.

3. In combination, a pair of variable speed generators, a storage battery circuit and a translation circuit, mains across which said elements are connected in parallel branches, said generators having field windings, an adjustable resistance, like terminals of said field windings being connected together through said resistance, a variable resistance medium connecting said field windings with said resistance across said mains, controlling means for said medium, electro-magnetic means in said battery circuit for operating said controlling means, electro-magnetic means connected across said mains for operating said controlling means and relay means for changing the effect of said last mentioned electro-magnetic means.

In witness whereof, I have hereunto subscribed my name.

WILLIAM A. TURBAYNE.